Sept. 19, 1967    R. W. BENNETT ETAL    3,342,158
COATING APPARATUS WITH TRACKING MEANS
Filed Feb. 1, 1965    3 Sheets-Sheet 1

INVENTORS
Robert W. Bennett and
Clarence F. Golladay.
BY Charles W. Gregg
AGENT

INVENTORS
Robert W. Bennett and
Clarence F. Golladay
BY Charles W. Gregg
AGENT 3,342,158
COATING APPARATUS WITH TRACKING MEANS
Robert W. Bennett and Clarence F. Golladay, Corning, N.Y., assignors to Corning Glass Works, Corning, N.Y., a corporation of New York
Filed Feb. 1, 1965, Ser. No. 429,553
6 Claims. (Cl. 118—7)

ABSTRACT OF THE DISCLOSURE

A container including a bottom outlet for emission of a material to be deposited upon surface of upturned brim of hollow vessel is pendulously supported and pivotally carries bell cranks whose first arms are pivotally interconnected and whose second arms carry extending fingers having ends equidistant from center of said outlet, such ends of the fingers continuously spring biased against inner and outer peripheral boundaries of said surface during rotation of hollow vessel about the center of plane of such surface.

---

The present invention relates to tracking apparatus. More specifically, the present invention relates to apparatus for precisely tracing or following a desired uniform path along the top surface of the annular brim of a hollow vessel. Still more particularly, the invention relates to apparatus for tracking the inner and outer peripheral borders of the top surface of the annular brim of a hollow vessel, whereby the geometric center point of an outlet orifice, provided in the bottom of a tank containing a coating material to be deposited on said top surface, is precisely maintained in alignment with a uniform path extending along such surface during rotation of said vessel substantially about the center point of the plane of its said annular brim, such alignment being maintained regardless of variations in the width of the top surface of such annular brim. The invention, for example, is especially useful in conjunction with apparatus for applying a thermal sealing glass frit or the like to the mating sealing surfaces of television picture tube panels and funnels, complemental pairs of which are to be sealed to each other to form television picture tube envelopes.

In Letters Patent of the United States Patent 2,880,697, issued Apr. 7, 1959 to Wendell S. Blanding and Frank Zimar for Coating Apparatus, there is disclosed, for example, apparatus for coating the mating annular sealing surfaces of television picture tube panels and funnels respectively with a solder glass frit. Such apparatus includes a coating material container or tank having a bottom outlet or orifice from which the coating material or glass frit is issued and applied to said sealing surfaces. There is employed, in conjunction with such tank, a roller which engages and tracks the contours of the outer peripheral border of the annular sealing surface of an article to be coated and, during rotation of the article, maintains the geometric center of the bottom outlet or orifice of the tank aligned with a path of travel which is a preselected uniform distance from such outer border.

It has been found, however, that the width of the annular brim or sealing surface of an article to be coated is not necessarily uniform, that is, that such width may vary somewhat, from a preselected norm, due to depressed or protuberant areas on the inner, outer, or both of the peripheral borders of the annular brim or sealing surface of an article to be coated. In other words, the annular sealing surface of an article to be coated may be somewhat narrower or wider at certain points along such surface than at certain other points therealong.

When a depressed or protuberant area occurs along the outer peripheral border of a sealing surface to be coated, the tracking roller of the aforesaid Blanding et al. patent follows the contours of such depressed or protuberant area and does maintain the geometric center of the bottom orifice of the coating material tank aligned with a path of travel which is said preselected uniform distance from such outer border. However, this is not necessarily the action desired under such conditions. For example, assuming that the preselected uniform distance from the outer peripheral border of a sealing surface to be coated, and which defines the desired path of travel of the center of the bottom orifice of the coating material tank, to be one half of the normal width of such sealing surface, that is, assuming said uniform distance to be such that said path of travel is along the centerline of such surface; a wider sealing surface due to a protuberant area or region along the outer peripheral border of such surface would force the tracing roller in a direction to move said orifice center toward said outer border a distance corresponding to the additional width of the sealing surface due to said protuberant area, thus overcompensating for such additional width and moving the orifice center off of the desired path of travel along the sealing surface centerline in said area. Similarly, a narrower sealing surface due to a depressed area or region along the outer peripheral border of the sealing surface would cause the center of the tank orifice to move toward the inner peripheral border of said surface a distance corresponding to the lesser width of the sealing surface due to said depressed area, thus overcompensating for such lesser width and moving the orifice center out of alignment with the sealing surface centerline in the depressed area of such surface. Also, if a depressed or protuberant area occurs along the inner peripheral border of the annular sealing surface of an article to be coated, the tracking roller does not move at all to compensate for the corresponding variation in the centerline of such surface. This will be discussed further hereinafter in this description in conjunction with certain of the figures of the drawings.

Accordingly, it is one object of the present invention to provide new and improved tracking apparatus which follows the contours of both the inner and outer peripheral boundaries of the top surface of the annular brim of a hollow vessel to which a coating material is to be applied, and which maintains the center of the bottom outlet orifice of a tank containing such material in a predetermined alignment with such surface, such as in alignment with the centerline thereof.

It is another object of the present invention to provide, in conjunction with coating apparatus of the class above described, a tracking mechanism which maintains the center of the bottom outlet orifice of a coating material tank or container in optimum alignment with a preselected path of travel along the upwardly disposed sealing surface of a rotating article.

In accomplishing the above objects of the invention, the sealing material tank or container, having a bottom outlet or orifice, is pivotally suspended and pivotally carries first and second bell cranks having first arms so interconnected that movement of one of such arms causes an equal and opposite movement of the second arms of such cranks. The second arms of such bell cranks each carry a finger, the end of each such finger being aligned with the end of the other finger and the center of said orifice, and the ends of both fingers being equidistantly disposed from such center. Said ends of such fingers contact and follow the contours of inner and outer peripheral boundaries of the top surface of the upwardly disposed brim of a hollow vessel which is to be coated with said sealing material.

Other objects and characteristic features will become apparent as the description proceeds.

The invention will best be understood with reference to the accompanying drawings in which.

Figure 1:
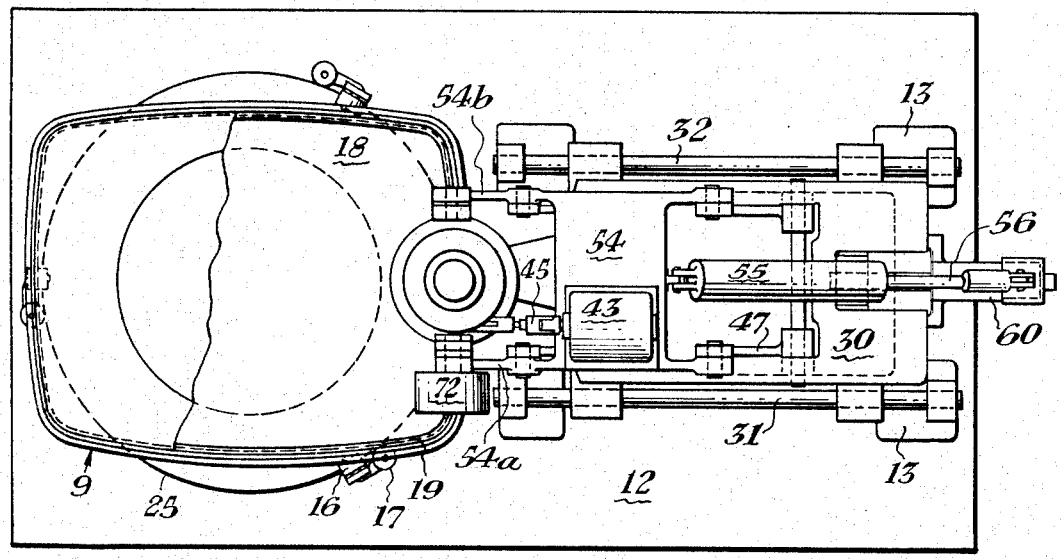
FIG. 1 is a plan view of coating apparatus incorporating the invention and illustrating a hollow vessel, such as television panel, partially broken away and supported by the coating apparatus.

FIGS. 5, 6, 7 and 8 comprise schematic illustrations of one of the advantages of the tracking apparatus of the present invention over that of the aforesaid Blanding et al. patent.

Similar reference characters refer to similar parts in each of the figures of the drawings.

Referring to the drawings in detail, the apparatus shown is similar to that of the Blanding et al. patent and comprises a suitable carriage 11 having a bed 12 upon which the various elements of the apparatus are arranged. A circular platform 25 is arranged for rotation about a vertical axis by being supported on three sets of vertical rollers such as 16 spaced approximately 120° from one another on bed 12. Platform 25 is confined against lateral movement by three horizontally disposed rollers such as 17. A support or cradle 9 is provided and is intended for supporting a hollow vessel 18, such as, for example, a rectangular television picture tube viewing panel, with the brim or sealing surface 19 of such vessel upwardly disposed for deposit thereon of a sealing material. Cradle 9 is carried upon the upward surface of a cam 15 which has an outer circumferential configuration corresponding to the configuration of the outer border of the upwardly disposed brim or sealing surface 19 of the vessel or viewing panel 18. Cradle 9 is centered on cam 15 and is securely affixed thereto in any convenient manner. Cam 15 is, in turn, centered on circular platform 25 and is securely affixed thereto in any convenient manner.

Rotation of platform 25 and cam 15, and thereby cradle 9 and viewing panel 18, is illustrated as being effected by a friction drive roller 20 (FIG. 2) which is forced against the outer periphery of cam 15 and is driven by a drive belt 23 looped around roller 20 and the output pulley 22 of a gear motor 21. However, if found desirable or expedient, a plurality of gear teeth can be provided about the periphery of cam 15 and a pinion gear substituted for roller 20, the teeth of the pinion gear cooperatively meshing with said plurality of gear teeth in driving relationship therewith and such gear being driven by a drive belt, such as 23, looped around a pulley attached to the pinion gear. As previously mentioned, cam 15 has an outer circumferential configuration corresponding to the configuration of the outer border of the sealing surface 19 of article or vessel 18. By such arrangement the sealing surface 19 of vessel 18 moves at a substantially uniform linear speed during rotational movement thereof by the rotation of drive roller 20 bearing against the periphery of cam 15. The arrangement will be further discussed hereinafter in this description.

Upright legs such as 13 support horizontal rods 31 and 32 (FIG. 1) upon which a platform 30 is supported for sliding movement toward and away from cradle 9 and cam 15. Another platform 24 is suspended from and below platform 30 by depending supports such as 26. Platform 24 carries the previously mentioned gear motor 21 and roller 20 which, thus, may be moved along with platform 30 toward and away from cam 15 and cradle 9.

Figure 2:
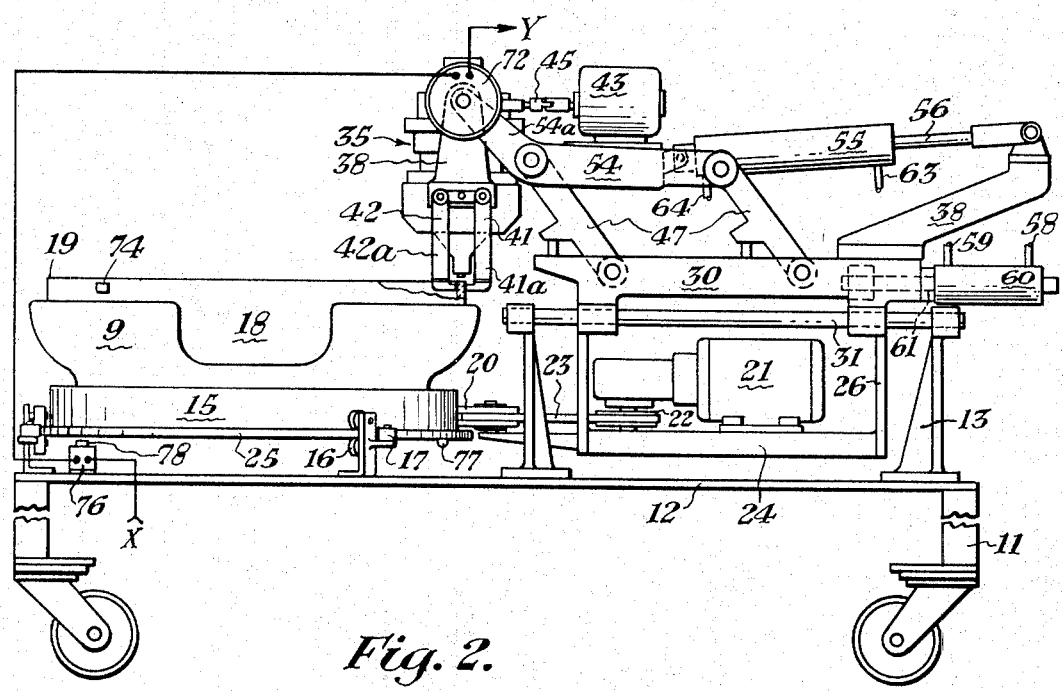
FIG. 2 is a side elevational view of the apparatus and vessel of FIG. 1.

A fluid pressure cylinder 60 is supported between the legs such as 13 and has its piston rod 61 connected to platform 30 to effect sliding movement thereof on and along rods 31 and 32. Thus, platforms 30 and 24 are moved, by piston rod 61, toward or away from cradle 9 and cam 15 according as pressurized fluid is supplied to conduits 58 and 59, respectively, connected to cylinder 60 (FIG. 2).

Arms such as 47 (FIG. 2) are pivotally connected to platform 30 and to a fourth platform 54 which supports a motor 43. A cylinder 55 is pivotally connected to platform 54 and has its piston rod 56 pivotally connected to an arm 38 (FIG. 2) secured to and extending slopingly upward and laterally away from platform 30. Thus, platform 54 is carried on the upper ends of the arms such as 47 toward or away from cradle 9 accordingly as pressurized fluid is supplied to conduits 64 or 63, respectively, connected to cylinder 55.

The sides of platform 54 extend outwardly and upwardly to form two supporting portions 54a and 54b from which is pivotally suspended, by arms 37 and 38 (FIGS. 2, 3 and 4) a container or tank 35 containing the coating material to be deposited on the sealing surface 19 of vessel or viewing panel 18. The output shaft of motor 43 is connected, by a universal coupling 45, to a stirrer within tank 35, such stirrer not being shown in the drawings since the internal structure of tank 35 forms no part of the present invention. Such stirrer may, however, be similar to that shown in FIG. 3 of the aforementioned Blanding et al. patent.

Figure 3:
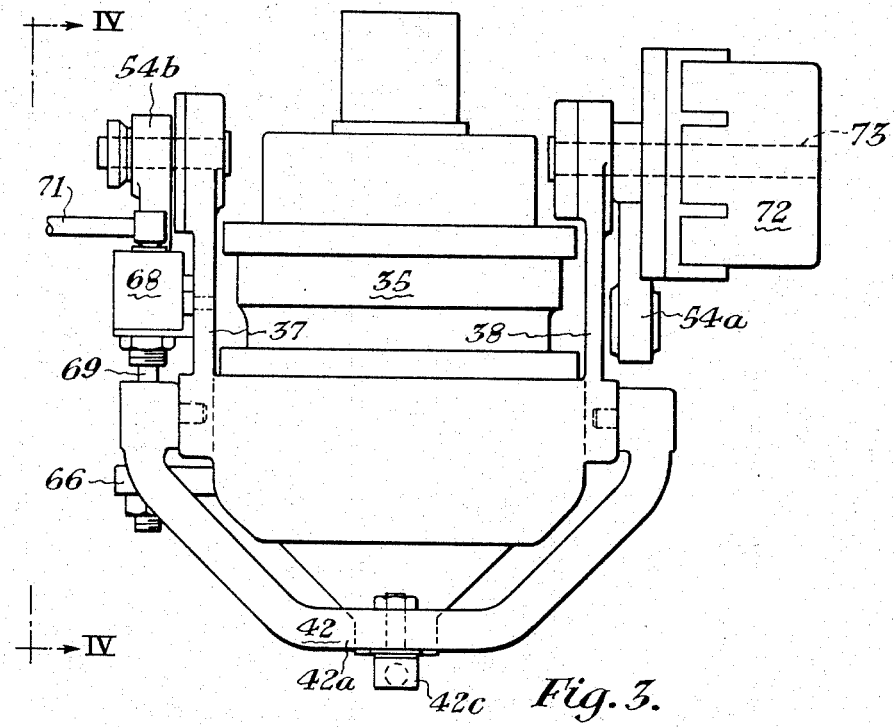
FIG. 3 is an elevational view, on an enlarged scale, of the coating material tank incorporating the tracking apparatus embodying the invention.
Figure 4:
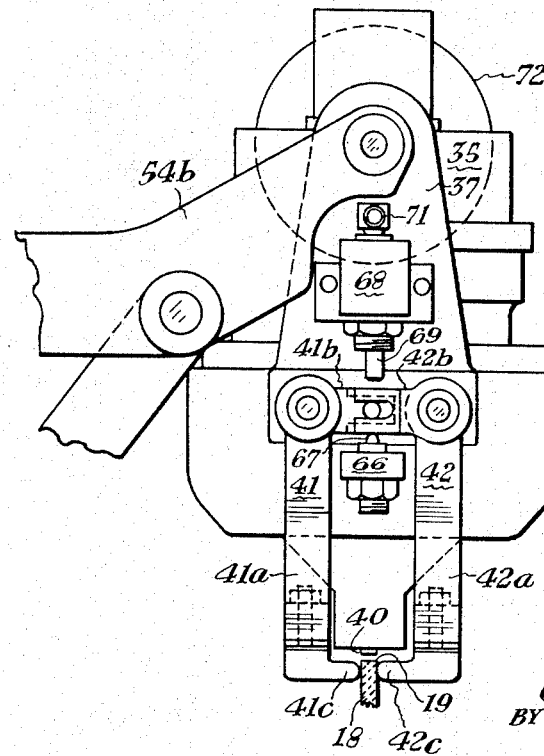
FIG. 4 is an elevational view of the coating material tank and associated tracking apparatus, such view being taken along line 4—4 of FIG. 3 and illustrating a section of the skirt portion of a hollow vessel, such as a television panel, whose sealing surface is to be coated.

As best illustrated in FIGS. 3 and 4 of the drawings, a first bell crank 42 having a depending yoke-shaped first arm 42a is pivotally connected to opposite sides of tank 35 (FIG. 3). A second bell crank 41, similar to crank 42 and having a depending yoke-shaped first arm 41a, is also pivotally connected to opposite sides of tank 35. Second arms 41b and 42b of bell cranks 41 and 42, respectively, extend toward each other and are interconnected in a scissors fashion by a fork and pivot arrangement (FIG. 4) such that any pivotal movement of one of the first arms 41a or 42a causes equal and opposite movement of the other of such arms. This is readily apparent by a brief glance at FIG. 4 of the drawings.

Arms 41a and 42a of bell cranks 41 and 42 are provided at their lower ends with a pair of oppositely disposed contacting devices or fingers 41c and 42c which may, for example, be bolted to their respectively associated bell crank arms 41a and 42a, as illustrated in FIGS. 3 and 4. The ends of said fingers are equidistantly disposed adjacent an outlet or orifice 40 provided in the bottom of tank 35 and from which the coating material to be deposited on the sealing surface 19 of vessel or panel 18 is issued (FIG. 4). Said ends of fingers 41b and 42b are aligned with each other and the geometric center of orifice 40. A plunger assembly 66 having a spring actuated plunger 67 is affixed to the side of tank 35 as shown in FIGS. 3 and 4 of the drawings. The plunger 67 of assembly 66 is normally spring biased to an extended position and may be depressed against its biasing spring to a position within assembly 66. The end of plunger 67 bears against the underside of the second arms 41b and 42b of bell cranks 41 and 42, and the plunger, thereby, normally retains arms 41a and 42a of said bell cranks in the position illustrated in FIG. 4, that is, with the ends of the contacting devices or fingers 41c and 42c bearing against opposite borders of the sealing surface 19 of a vessel or panel such as 18.

A pressurized fluid cylinder 68 (FIGS. 3 and 4) having a spring biased piston rod or plunger 69 is affixed to arm 37 supporting tank 35. The piston rod or plunger 69 is normally spring biased to a retracted position within the cylinder 68 as shown in FIG. 4 of the drawings. When pressurized fluid is supplied to cylinder 68 through a conduit 71 connected to such cylinder (FIG. 3) the piston rod 69 is actuated to an extended position and bears downwardly against the upper part of arms 41b and 42b of cranks 41 and 42 to overcome the force supplied to the underside of said arms by plunger 67 of plunger assembly 66. Arms 41b and 42b are thus forced downwardly thereby actuating the lower ends of arms 41a and 42a away from each other, and the ends of fingers 41c and 42c away from and out of contact with vessel or panel 18. Upon release of the pressurized fluid supplied to conduit 71, piston rod 69 is again retracted by its spring biasing means to its normal position shown in FIG. 4 and plunger 67 then supplies sufficient force to the underside of arms 41b and 42b to cause arms 41a and 42a, and fingers 41c and 42c to assume the positions illustrated in FIG. 4. Pressurized fluid cylinders such as 68 are well known. The purpose of the opening and closing action of arms 41a and 42a, and their associated fingers 41c and 42c, will be further briefly discussed hereinafter in an operational example of the apparatus.

Some hollow vessels such as television picture tube funnels or viewing panels have protrusions intentionally provided thereon adjacent the outer peripheral border of the sealing surface of such articles, such protrusions being provided for the purpose of referencing pairs of such parts to each other for sealing thereof. Such protuberance or protrusion is shown on the vessel or panel 18 in FIG. 2 of the drawings and is designated by the reference character 74. When such a protuberance passes under the bottom outlet or orifice 40 of the coating material tank 35, it is desired that the tank does not move so as to cause the geometric center of said orifice to follow the centerline of the wider sealing surface occasioned by the presence of said protuberance on the outer peripheral border of such surface. Accordingly, a magnetic or electric brake 72 is affixed to extension 54a of platform 54 and keyed, in any convenient manner, to axle 73 from which tank 35 is pivotally suspended by arm 38 (FIG. 3). Arm 38 is keyed to axle 73, in any convenient manner, so that such axle rotates with any lateral movement of arm 38. It will thus be apparent that when magnetic brake 72 is energized, in the manner discussed below, axle 73 becomes locked against rotational movement and prevents lateral movement of arm 38 and, thereby, tank 35. Magnetic or electric brakes such as 72 are well known and such brake may, for example, be the size 250 RF type electric brake manufactured and sold by Warner Electric Brake & Clutch Company, Beloit, Wisconsin, such brakes being shown and described in a bulletin published by such company.

An electric spring biased push button switch 76 is affixed to the top of bed 12 (FIG. 2) and a projection 77 is provided on the bottom of circular platform 25, such switch and projection being provided at locations selected so that projection 77, during the rotation of platform 25, contacts and depresses the push button 78 of said switch during the passage, beneath the bottom outlet or orifice 40 of tank 35, of the region of the sealing surface 19 adjacent said protuberance. Switch 76 is of the type which closes electrical contacts to complete an electrical circuit when its push button 78 is depressed against spring biasing means, such push button being actuated by such spring biasing means to its normal undepressed position, thereby opening said electrical contacts, when it is no longer contacted and depressed by projection 77. The electrical circuit through switch 76 extends from a first terminal X of a source of electrical energy of proper voltage for the desired energization and locking of brake 72, through the contacts of the switch in their closed position during the depression of push button 78 of the switch, and thence through the control windings of brake 72 to a second terminal Y of said source of electrical energy (FIG. 2). For purpose of simplification of the drawings said source of electrical energy is not shown therein.

It should be pointed out at this point in the description that, when a vessel such as 18 does not have a protuberance such as 74 (FIG. 2) a projection such as 77 is not provided on the bottom of platform 25. When more than one protuberance such as 74 exists on the outer peripheral border of the vessel 18, a projection such as 77 is provided for each such protuberance. It will be readily understood, in the light of the previous discussion, that the location of each such projection provided on the bottom of platform 25 depends on the location of a respectively associated protuberance on vessel 18 and the location of switch 76. By such arrangement push button switch 78 will be actuated to its circuit closing condition each time one of said protuberances such as 74 passes adjacent the bottom outlet of tank 35.

The apparatus is illustrated in FIGS. 1 and 2 of the drawings in its operating condition, that is, friction drive roller 20 is being maintained against the periphery of cam 15 by pressurized fluid, such as compressed air, being supplied over conduit 58 to cylinder 60, such fluid actuating piston rod 61 to cause platforms 30 and 24 to move towards cam 15 and cradle 9. Gear motor 21 is assumed to be energized over an electrical circuit (not shown) and drives roller 20 by means of drive belt 23. During the rotation of cam 15 by roller 20, circular platform 25 rotates about its center axis, being held in such piston by the rollers such as 17. Cam 15 also rotates about its center axis but, being somewhat rectangular, it causes roller 20, and thereby platforms 24, 30 and 54, to move alternatively toward and away from the center axis of platform 25. However, the pressurized fluid supplied to cylinder 60 maintains roller 20 in a driving relationship against the periphery of cam 15 as previously mentioned.

As shown in FIGS. 2 and 4, container or tank 35 is disposed with its bottom outlet or orifice 40 directly above the sealing surface 19 of the hollow vessel 18 which may, for example, comprise a television picture tube funnel or panel as previously mentioned. Tank 35 being carried by extensions of platform 54, which is in turn carried by platform 30, moves toward and away from cradle 9 along with platform 30, such movements of platform 30 being caused, as mentioned above, by the rotation of cam 15. As heretofore discussed, cam 15 has a peripheral configuration corresponding to the configuration of the annular brim or sealing surface of upturned vessel 18 and, therefore, the to-and-fro action caused by cam 15 maintains tank 35 directly above such sealing surface during rotation of cradle 9 and vessel 18 supported by such cradle.

During the rotational operation of circular support 25, cam 15, cradle 9 and vessel 18 described above, coating material is being issued from tank 35, through the bottom outlet or orifice 40 thereof, and is being deposited on the upturned sealing surface or brim 19 of vessel 18. The manner in which the issuance of coating material from tank 35 is controlled forms no part of the present invention and, therefore, the details thereof are not shown or described herein. If desired, reference may be had to the aforementioned patent to Blanding et al. for a complete detailed description and understanding of the internal structure of a coating material container or tank, such as 35, and the manner in which the issuance of coating material therefrom may be controlled.

Referring to FIG. 4, it will be seen that, during rotation of vessel 18, the ends of contacting devices or fingers 41c and 42c are maintained against the inner and outer peripheral borders of the brim or sealing surface 19 of such upturned vessel by the force of plunger 67 pushing upwardly against arms 41b and 42b of bell cranks 41 and 42. The ends of such fingers being disposed equidistantly from the geometric center of orifice 40 of tank 35, as previously mentioned, such orifice center is maintained, during rotation of vessel 18, precisely aligned above the centerline of sealing surface 19 of such vessel. The sealing material issued from orifice 40 is, thus, deposited evenly between the edges or peripheral borders of such surface, that is, along said centerline.

Figure 5:
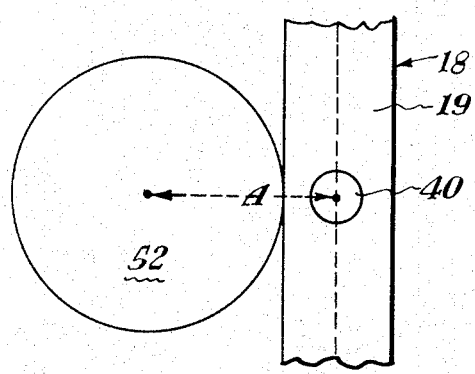
Figure 6:
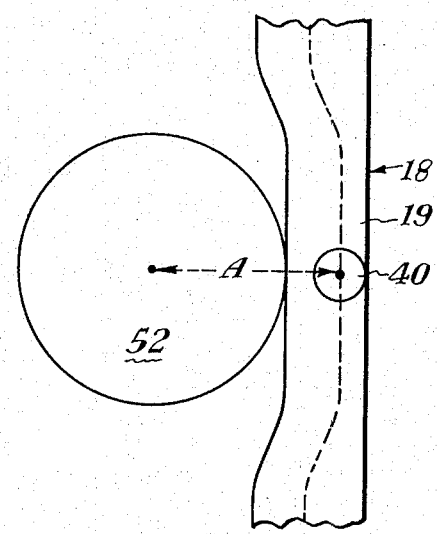

Referring now to FIGS. 5 through 8 of the drawings, there is shown, as previously mentioned one example of the advantages of the tracking apparatus of the present invention over that disclosed in the cited Blanding et al. patent. In FIGS. 5 and 6 of the present application reference character 52 designates the article border engaging roller 52 illustrated in FIG. 3 of said patent. In FIGS. 5 through 8 of the present application, reference character 40 designates the bottom orifice 40 of tank 35 as illustrated in FIG. 4 of the drawings. The other reference characters in FIGS. 5 through 8 designate obvious parts also shown in other drawings of the present application.

FIG. 5 illustrates said roller 52 of Blanding et al. contacting the outer peripheral border of the sealing surface 19 of a vessel 18, such sealing surface being of uniform width. FIG. 6 shows the same roller when it contacts an exaggeratively illustrated depressed area along the same border of said sealing surface. It will be noted that the distance A indicated in both drawing figures remains, of course, the same and, therefore, the geometric center of orifice 40 in FIG. 6 moves too far toward the inner border of sealing surface 19, that is, the geometric center of orifice 40 does not follow the centerline of surface 19 in the region of said depressed area but follows the dotted line illustrated.

Figure 7:
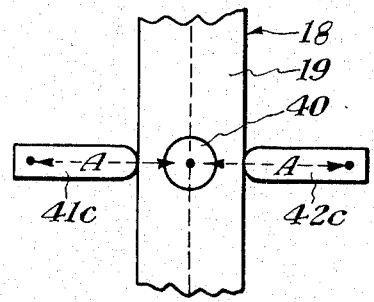
Figure 8:
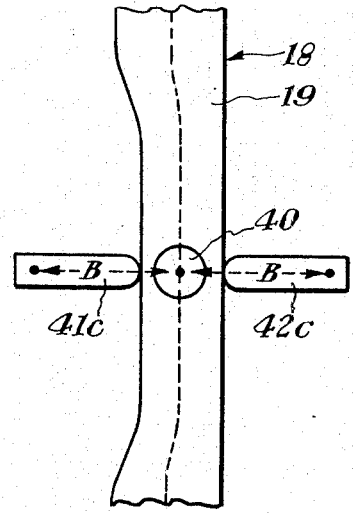

Referring now to FIG. 7, the ends of contacting devices or fingers 41c and 42c are shown contacting the inner and outer peripheral borders of the sealing surface 19 of a vessel 18, such sealing surface being of uniform width. The distances A illustrated in such figure are identical and the geometric center of orifice 40 is aligned with the centerline of surface 19. FIG. 8 shows the contacting fingers when finger 41c is adjacent an exaggeratively illustrated depressed area occurring in the respective border with which said finger is in contact and the contours of which such finger is intended to follow. It will be noted, under such conditions, that the identical distances A of FIG. 7 correspondingly decrease to the identical distances B of FIG. 8. Thus the geometric center of orifice 40 follows the dotted line illustrated in FIG. 8, such dotted line illustrating the centerline of surface 19 in the region of the depressed area as well as along the remainder of such surface. The reason for the equal compensation for the depressed area of the sealing surface 19 illustrated in FIG. 8 is best understood by reference to FIG. 4 of the drawings. It will be noted, by reference to such drawing figure, that if the end of one of the fingers 41c or 42c moves closer to the end of the other of such fingers due to a depressed area in the respectively contacted border of sealing surface 19, such other finger moves a like distance, due to the interconnection between the arms 41b and 42b of bell cranks 41 and 42, and the change in width occurring in such sealing surface is equally compensated for by both such fingers. At such time tank 35 and its suspending arms 37 and 38 pivotally move on supporting extensions 54a and 54b of platform 54 and the geometric center of the orifice 40 of tank 35 is thereby maintained in alignment with the centerline of sealing surface 19, as illustrated in FIG. 8.

In the light of the above discussion, it will be readily apparent that the tracking apparatus of the present invention, including the contacting devices or fingers 41c and 42c, provides for equal compensation for variations in the width of a sealing surface or brim, such as surface 19 of an upturned vessel 18, regardless of whether such variations are due to depressed areas or protuberant areas in one or both of the peripheral borders of such a surface, or due to a combination of such areas in one or both of such borders.

Following the desired deposition of the sealing material on the sealing surface 19 of a vessel such as 18, the emission of such sealing material is terminated and electrical energy to gear motor 21 is interrupted. Cam 15, platform 25, cradle 19 and vessel 18 cease to rotate and pressurized fluid is supplied over conduit 71 to cylinder 68 (FIGS. 3 and 4). Piston rod 69 is thus actuated downwardly against the upper surfaces of arms 41b and 42b, and fingers 41c and 42c are thereby actuated outwardly and out of contact with the borders of the sealing surface 19 of vessel 18. Pressurized fluid is then supplied to conduit 63 connected to cylinder 55 (FIG. 2) and such cylinder moves on piston rod 56 and moves platform 54, tank 35, and crank arms 41 and 42, as well as the remainder of the apparatus carried by such platform, on the arms such as 47 and up and away from cradle 9 and vessel 18. It will be noted that, at such time, the upward movement of tank 35 assures that the then open fingers 41c and 42c clear the borders of sealing surface 19 of vessel 18.

Following full retraction of piston rod 56 within cylinder 55, pressurized fluid is supplied to conduit 59 to retract roller 20 away from cam 15, and the remainder of the apparatus carried on rods 31 and 32, further away from cradle 9 and vessel 18. The vessel 18 can then be removed from cradle 9 and another such vessel cradled therein for coating of the upturned brim or sealing surface, such as 19, of such other vessel. The apparatus may then be actuated in the reverse direction, from that just described, by successively supplying pressurized fluid to conduits 58 and 64 connected to cylinders 60 and 55, respectively. Following such actuation, the pressurized fluid supplied to cylinder 68 (FIG. 4) over conduit 71 (FIG. 3) is released and plunger 67, pressing upwardly against the bottom surfaces of arms 41b and 42b of bell cranks 41 and 42, moves such arms upwardly thereby causing the ends of fingers 41c and 42c to contact the inner and outer peripheral borders of the sealing surface 19 of the new vessel 18.

It is pointed out that the pressurized fluid supplied to conduits 58, 59, 63, 64 and 71 may be controlled by manually actuated means or may be controlled by a system similar to that shown in FIG. 4 of the Blanding et al. patent. Such controls are well known in the art and the details thereof form no part of the present invention.

Although the invention is herein discussed as having special utility in conjunction with apparatus for the coating of the complemental sealing surfaces of television picture tube funnels and viewing panels, it is to be understood that the invention is not intended to be confined to use with such apparatus but may be employed, in the scope of the appended claims, in conjunction with any apparatus in which it is desired to trace or track the borders of a surface upon which, for example, a material is to be precisely deposited.

What is claimed is:

1. In combination with a tank provided with a bottom orifice for emission therefrom of a material to be deposited on the top surface of the annular brim of a hollow vessel supported by means for rotating such vessel about the center point of the plane of such brim and said surface being of varying width, apparatus for maintaining the geometric center point of said orifice in alignment with the centerline of said surface during rotation of said vessel substantially about the centerpoint, such apparatus comprising; a pair of bell cranks oppositely pivoted to said tank and each including first and second arms, said first arms of such cranks extending to points adjacent said orifice and equidistant therefrom, the ends of such arms each provided with a similar tracking device for contacting and following the contour of the inner and outer peripheral borders respectively of said surface during said rotation of the hollow vessel, the ends of the seconds arms of said cranks so interconnected that a movement of one of said first arms will cause an equal and opposite movement of the other of said first arms; spring biasing means for maintaining said tracking devices in their respective contour following attitudes during said rotation of the hollow vessel, and means pivotally mounting said tank for lateral movement thereof in line with said tracing devices and with the orifice of the tank facing said surface.

2. Apparatus in accordance with claim 1 and further including means for locking said tank against said lateral movement at preselected times during the rotation of said vessel.

3. In combination with a tank having a bottom orifice for emission therefrom of a material to be deposited on the upper surface of the annular brim of an upright hollow vessel supported by means for rotating such vessel about the center point of the plane of such brim and said surface having a varying width; apparatus for maintaining the geometric center of said orifice in alignment with the centerline of said surface during rotation of said vessel, such apparatus comprising, means pivotally supporting said tank with said orifice facing said surface in close proximity thereto and laterally movable thereabove; first and second tracking fingers carried on the ends of first arms of first and second bell cranks respectively, each such bell crank also including a second arm, the ends of said fingers contacting the inner and outer peripheral borders respectively of said surface for following the contours thereof during rotation of said vessel, such bell cranks pivotally and oppositely carried on said tank with the ends of said fingers oppositely equidistant from the geometric center of said orifice and with such center and the ends of the fingers in alignment with each other and movable in such alignment laterally with respect to said surface, and the second arms of said cranks interconnected with each other so that lateral movement of either one of said first arms will simultaneously cause equal and opposite lateral movement of the other of said first arms; and means for biasing said cranks in a direction to maintain the ends of said fingers in their respective peripheral border contour following attitudes during rotation of said vessel.

4. In an apparatus for coating the sealing surfaces of television picture tube viewing panel and funnel parts, and including means for individually and rotatably supporting each such part with its sealing surface upright and further including a tank with a bottom orifice for emission of a coating material; the combination comprising; means for supporting said tank with said orifice laterally movable above and facing, in close proximity thereto, the sealing surface of a part to be coated; first and second bell cranks pivotally and oppositely mounted on said tank and each such crank including first and second arms; first and second tracking fingers carried on the ends of said first arms of said first and second cranks respectively, the ends of said fingers contacting the inner and outer peripheral borders respectively of the sealing surface of the part to be coated and laterally movable for following the contours of the respectively contacted borders during rotation of such part, said cranks being disposed on said tank so that the geometric center of said orifice is aligned with a preselected line along said sealing surface when the ends of both said fingers contact their respective said peripheral borders; means interconnecting said second arms of said cranks so that lateral movement of any one of said first arms will simultaneously cause equal and opposite lateral movement of the other of such first arms, and means for biasing said cranks in a direction to maintain the ends of said fingers in their respective peripheral border contour following attitudes during rotation of said part to be coated.

5. Apparatus in accordance with claim 4 and further including a normally unactuated locking device for locking, when actuated, said tank to prevent lateral movement of said orifice; and means responsive to the rotation of said part supporting means for actuating said locking device to its locking condition at at least one preselected point in the rotation of such supporting means.

6. Apparatus in accordance with claim 5 in which said locking device comprises a normally de-energized electrically actuated brake and said actuating means comprises a normally open electric switch for closing a circuit for energization of such brake at at least said one preselected point in the rotation of said supporting means.

References Cited

UNITED STATES PATENTS

| | | | |
|---|---|---|---|
| 1,630,505 | 5/1927 | Walther | 33—191 |
| 2,880,697 | 4/1959 | Blanding et al. | 118—8 X |
| 3,052,033 | 9/1962 | Studt | 33—42 |

FOREIGN PATENTS

| | | |
|---|---|---|
| 526,336 | 6/1956 | Canada. |

CHARLES A. WILLMUTH, *Primary Examiner.*

J. P. McINTOSH, *Assistant Examiner.*